United States Patent [19]

Johnson

[11] 4,359,098
[45] Nov. 16, 1982

[54] AUTOMATIC ON-OFF FIRE SPRINKLER HEAD

[75] Inventor: Wilfred V. Johnson, Oxford, Mass.

[73] Assignee: U.S. Fire Control Corporation, Oxford, Mass.

[21] Appl. No.: 197,219

[22] Filed: Oct. 15, 1980

[51] Int. Cl.³ .............................................. A62C 39/00
[52] U.S. Cl. ........................................ 169/90; 251/45
[58] Field of Search ...................... 169/37, 90, 22, 42; 251/45, 46; 60/527; 236/100

[56] References Cited

U.S. PATENT DOCUMENTS

| | | | |
|---|---|---|---|
| 3,022,039 | 2/1962 | Conerod | 251/46 |
| 3,536,294 | 10/1970 | Rodiguez | 251/45 |
| 3,749,176 | 7/1923 | Gremier | 251/45 |
| 4,132,237 | 1/1979 | Kennedy et al. | 251/45 |
| 4,187,683 | 2/1980 | Northrop, Jr. | 60/527 |

*Primary Examiner*—Joseph J. Rolla
*Assistant Examiner*—Kenneth Noland

[57] ABSTRACT

An automatic on-off sprinkler head including a housing that defines a primary chamber and a pilot chamber enclosed thereby; an inlet orifice and outlet orifice both opening into the primary chamber; a primary valve seat located between the inlet and the outlet orifices; a movable valve closure comprising a flexible diaphragm wall portion separating the primary chamber from the pilot chamber, the valve closure remaining against the valve seat to prevent fluid flow between the inlet and the outlet orifices in response to less than a predetermined differential pressure across the wall portion and movable away from the valve seat to permit fluid flow between the inlet and outlet orifices in response to a differential pressure greater than the predetermined pressure; a fill port providing limited fluid flow between the inlet orifice and the pilot chamber; a release port for discharging fluid from the pilot chamber; and a pilot valve controlling fluid flow through the release port. In response to a fire condition, a sensor moves the normally closed pilot valve into an open position and thereby produces a differential pressure across the wall portion that opens the main valve closure.

11 Claims, 2 Drawing Figures

AUTOMATIC ON-OFF FIRE SPRINKLER HEAD

BACKGROUND OF THE INVENTION

Fire extinguishing sprinkler systems generally employ single operation sprinkler heads having a fusible link that melts to release a plug that normally prevents the flow of water. Once the plug is released, water is discharged from the head in a desired pattern. Such sprinkler heads must be replaced after operation and often produce extensive water damage.

In attempts to both reduce the incidence of water damage and conserve water, there have been developed many types of so-called "on-off" sprinkler heads that open in response to a fire condition and automatically close after extinguishment thereof. Typically such on-off valves utilize a temperature responsive sensor that either directly actuates a main valve member or actuates a pilot valve to create a differential pressure condition that opens a main valve member. Typical examples of such on-off sprinkler heads are disclosed in U.S. Pat. Nos. 4,128,128; 3,802,510; 3,757,866; and 3,746,098. Although these prior on-off sprinkler heads desirably function to stop water flow after extinguishment of a fire, they exhibit either collectively or individually various deficiences such as unreliability, temperature insensitivity, water leakage through movable seals when in a closed condition, requirements for transversely oriented inlet and outlet orifices, etc.

The object of this invention, therefore, is to provide an improved on-off sprinkler head for use in fire extinguishing systems.

SUMMARY OF THE INVENTION

The invention is an automatic on-off sprinkler head including a housing that defines a primary chamber and a pilot chamber enclosed thereby; an inlet orifice and outlet orifice both opening into the primary chamber; a primary valve seat located between the inlet and the outlet orifices; a movable valve closure comprising a flexible diaphragm wall portion separating the primary chamber from the pilot chamber, the valve closure remaining against the valve seat to prevent fluid flow between the inlet and the outlet orifices in response to less than a predetermined differential pressure across the wall portion and movable away from the valve seat to permit fluid flow between the inlet and outlet orifices in response to a differential pressure greater than the predetermined pressure; a fill port providing limited fluid flow between the inlet orifice and the pilot chamber; a release port for discharging fluid from the pilot chamber; and a pilot valve controlling fluid flow through the release port. In response to a fire condition, a sensor moves the normally closed pilot valve into an open position and thereby produces a differential pressure across the wall portion that opens the main valve closure. The disclosed valve is highly resistant to leakage when in a closed condition and sensitively responds to fire conditions by establishing fluid discharge between rectilinearly aligned inlet and outlet orifices.

In a preferred embodiment of the invention, the primary valve seat defines a discharge passage between the inlet and outlet orifices and the flexible diaphragm portion of the valve closure engages the valve seat to close the discharge passage in the absence of a differential pressure greater than the predetermined differential pressure. The use of a flexible diaphragm as a valve closure eliminates any requirement for movable seals and thereby reduces the possibility of leakage with the valve in a closed condition.

DESCRIPTION OF THE DRAWINGS

These and other objects and features of the present invention will become more apparent upon a perusal of the following description taken in conjunction with the accompanying drawing wherein.

DESCRIPTION OF THE PREFERRED EMBODIMENT

Figure 1:
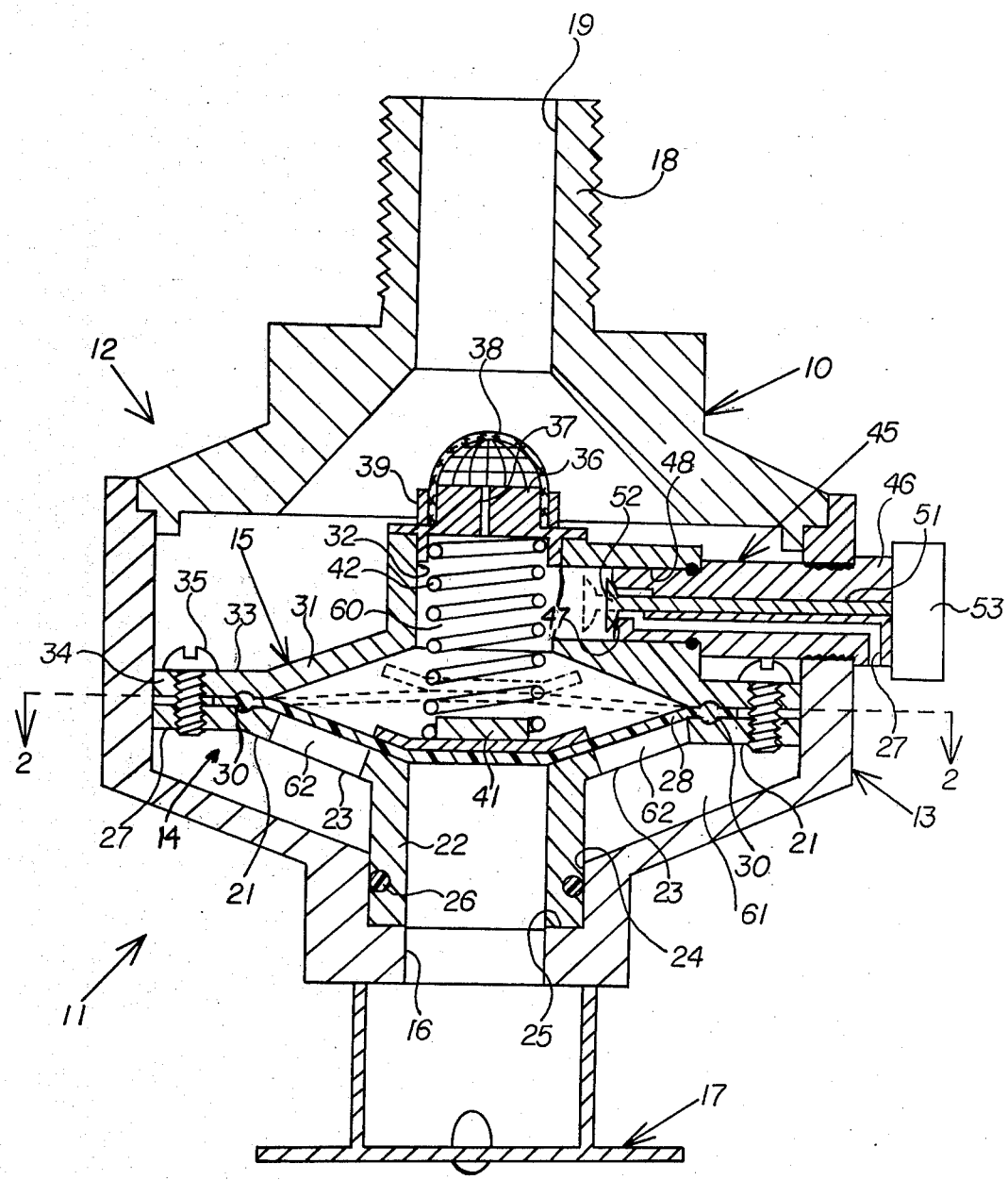
FIG. 1 is a schematic cross-sectional view of an on-off valve according to the invention.

Referring now to FIG. 1, there is shown an automatic on-off fire sprinkler head 11 according to the invention. The head 11 includes a housing 12 formed by an outer base portion 13, an outer cover portion 10, an inner base assembly portion 14 and an inner cover assembly portion 15. Forming the outer base portion 13 is a cup-shaped member that defines at its lower end an outlet orifice 16. Extending from the outer base portion 13 is a deflector assembly 17 positioned to disperse fluid discharged from the outlet orifice 16. The outer cover portion 10 includes a threaded nipple portion 18 that is adapted for connection to a water source and defines an inlet orifice 19 rectilinearly aligned with the outlet orifice 16.

Figure 2:
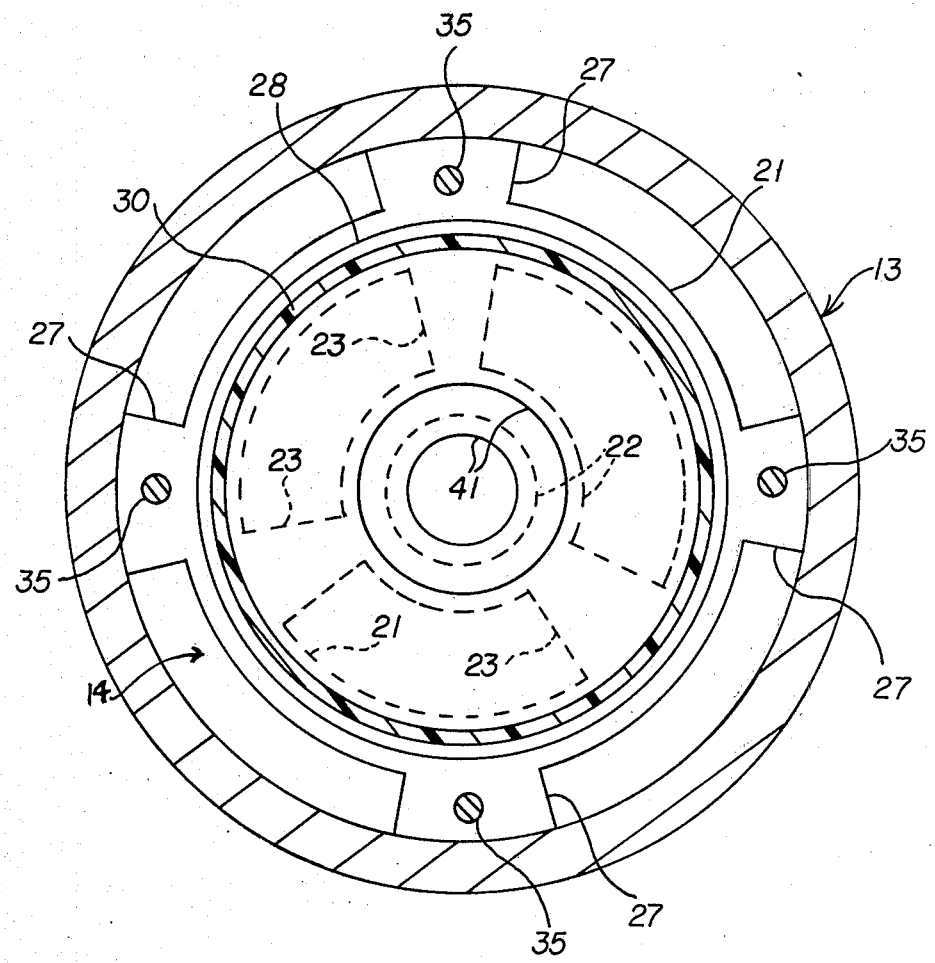
FIG. 2 is a schematic cross-sectional view taken along lines 2—2 of FIG. 1.

As shown in FIG. 2, the inner base portion 14 includes a circular rim 21 that is joined to a vertical oriented cylinder portion 22 by a plurality of spaced apart spokes 23. The cylindrical portion 22 is received by an internal recess 24 in the outer base portion 13 and rests upon an annular shoulder 25 formed thereby. A watertight seal is created between the outer surface of the cylinder 22 and the recess 24 by an annular O-ring 26. Extending from the outer periphery of the circular rim 21 are a plurality of spaced apart fingers 27 that engage the inner surface of the cup-shaped outer base member 13. Also part of the base assembly 14 is a flexible diaphragm 28, the function of which is described below.

The inner cover assembly 15 comprises an inverted cup-shaped member 31 with an upwardly directed opening 32 and a radially projecting rim portion 33 that is aligned with the rim portion 21 of the inner base assembly 14. Extending outwardly from the rim portion 33 are a plurality of fingers 34 that are aligned with the fingers 27 of the lower base assembly 14 and are secured thereto by screws 35. As shown in FIG. 1, a peripheral O-ring portion 30 of the diaphragm 28 is sealed between the rim portions 21 and 33 by the screws 35. Closing the opening 32 in the inverted cup member 31 is a cap 36 through which extends a fill port 37. A screen member 38 covers the port 37 and is secured to the cap 36 by an annular ring member 39. Extending between an inner surface of the cap 36 and a retainer 41 secured to a central portion of the diaphragm 28 is a compression spring member 42.

A pilot valve assembly 45 is retained by the housing 12 as shown in FIG. 1. Included in the pilot valve assembly 45 is an elongated body portion 46 defining at one end a pilot valve seat 47 that extends into an opening 48 in the inner cover assembly 15. The opposite end of the body portion 46 extends through and is threadedly engaged with an opening in the outer base portion 13. Extending through a central passage in the body portion 46 is a valve stem 51 supporting at one end a pilot valve 52. The opposite end of the stem 51 is operatively engaged with a conventional wax motor 53 supported by the valve assembly 45. Also defined by the valve body portion 46 is an elongated release port 54 that extends between the pilot valve 52 and the environment outside the device 11.

The outer base portion 13 and cover portion 10 define a primary chamber 61 which communicates with the inlet orifice 19 and the outlet orifice 16 via the cylindrical portion 22 and discharge passage 62 formed between the rim portion 21 and the spokes 23. Those passages 62 are normally closed by the diaphragm valve closure 28 that engages a primary valve seat formed by the inner base assembly 14. The diaphragm 28 is biased in that closed position by the compression spring member 42. The inner base assembly 14 and cover assembly 15 define a pilot chamber 60 that is enclosed by the primary chamber 61.

During use, the head 11 is mounted in a region wherein fire protection is desired and the inlet orifice 19 is connected to a source of water pressure. In response to normal conditions, the wax motor 53 maintains the pilot valve 52 closed to thereby seal the release port 54. Consequently, water flow through the limited path provided by the fill port 37 establishes within the pilot volume 60 a pressure equal to that at the inlet orifice 19 and accordingly, to that within the primary chamber 61. Because of the resultant substantially equal fluid pressures on opposite sides of the diaphragm 28, the spring member 43 retains the diaphragm closure 28 against the primary valve seat to close the passages 62 and prevent the discharge of water through the outlet orifice 16. In response to excessive ambient temperature created by a fire condition, however, the wax in the motor 53 melts and expands forcing the stem 51 inwardly to open the pilot valve 52 as shown by dotted lines in FIG. 1. Water within the pilot chamber 60 is discharged through the release port 54 which allows a higher rate of flow than does the fill port 37. Consequently, the water pressure within the pilot chamber 60 is reduced to a level substantially below the inlet pressure existing within the primary chamber 61. The resultant increase in the differential pressure across the diaphragm 28 overcomes the bias spring member 42 forcing the diaphragm 28 to the open position shown by dotted lines in FIG. 1. After opening of the primary valve closure 28, the open discharge passages 62 permit water flow between the inlet orifice 19 and the outlet orifice 16 resulting in a discharge of water against the deflector 17.

After extinguishment of the fire and reduction of ambient temperature to normal levels, the wax within the motor 53 solidifies causing the stem 51 to withdraw and close the pilot valve 52. This closure of the release port 54 and subsequent water flow through the fill port 37 causes a pressure buildup in the pilot chamber 60. When that pressure reaches a level that establishes less than a predetermined differential pressure across the diaphragm closure 28, the diaphragm closure 28 is forced by the spring member 42 against the inner base assembly portion 14 to again close the discharge passages 62 and interrupt the flow of water out of the outlet orifice 16.

Obviously, many modifications and variations of the present invention are possible in light of the above teachings. It is to be understood, therefore, that the invention can be practiced otherwise than as specifically described.

What is claimed is:
1. An automatic on-off sprinkler head comprising:
   housing means defining a primary chamber and a pilot chamber enclosed thereby, an inlet orifice and an outlet orifice both opening into said primary chamber; a primary valve seat located between said inlet and outlet orifices; a movable valve closure means comprising a flexible diaphragm wall portion separating said primary chamber from said pilot chamber, said valve closure means remaining against said valve seat to prevent fluid flow between said inlet and outlet orifices in response to less than a predetermined differential fluid pressure across said wall portion and movable away from said valve seat to permit fluid flow between said inlet and outlet orifices in response to a differential pressure across said wall portion greater than said predetermined pressure; a fill port providing limited fluid flow between said inlet orifices and said pilot chamber; and a release port for discharging fluid from said pilot chamber;
   a pilot valve means closing said release port in a closed position and opening said release port in an open position;
   a temperature sensor for moving said pilot valve means to said open position in response to the occurrence of an ambient temperature above a given level; and
   deflector means supported by said housing means and disposed to deflect fluid discharging from said outlet orifice in a fire extinguishing pattern.

2. A sprinkler head according to claim 1 wherein said temperature responsive sensor comprises a wax motor.

3. A sprinkler head according to claim 1 including deflector means supported by said housing means and disposed to deflect fluid discharging from said outlet orifice.

4. A sprinkler head according to claim 1 including a spring member urging said valve closure means toward said valve seat.

5. A sprinkler head according to claim 1 wherein said inlet orifice and said outlet orifice are rectilinearly aligned.

6. A sprinkler head according to claim 1 wherein said valve seat defines a discharge passage between said inlet orifice and said outlet orifice, and said flexible diaphragm engages said valve seat and closes said discharge passage in response to less than said predetermined differential pressure.

7. A sprinkler head according to claim 6 including a spring member urging said valve closure means toward said valve seat.

8. A sprinkler head according to claim 6 wherein said inlet orifice and said inlet orifice are rectilinearly aligned.

9. A sprinkler head according to claim 1 wherein each opposite surface of said flexible diaphragm defines an annular rib, and said wall portion comprises a pair of annular rim members that straddle a peripheral portion of said diaphragm, each of said rim members defining an annular recess that receives one of said annular ribs and provides a liquid seal therewith.

10. An automatic on-off fire sprinkler head comprising:
   housing means defining a primary chamber, a pilot chamber, an inlet orifice, an outlet orifice, a fluid flow path between said orifices, a fill port providing limited fluid flow between said inlet orifice and said pilot chamber, and a release port for discharging fluid therefrom;

flexible diaphragm means supported by said housing means directly in said flow path between said inlet and outlet orifices, said diaphragm means comprising diaphragm wall portions shaped and arranged to open said flow path between said orifices when in an open position and to close said flow path when in a closed position, said diaphragm means being further shaped and arranged to have first surface portions exposed to the fluid pressure in said primary chamber and surface portions opposite to said first surface portions and exposed to the fluid pressure in said pilot chamber, and wherein said diaphragm wall portions are moved to said open position in response to a predetermined difference in fluid pressure between said pilot and primary chambers and are retained in said closed position in response to a difference in fluid pressure therebetween less than said predetermined pressure;

a pilot valve means closing said release port in a closed position and opening said release port in an open position;

a temperature sensor for moving said pilot valve means to said open position in response to the occurrence of an ambient temperature above a given level; and deflector means supported by said housing means and disposed to deflect fluid discharging from said outlet orifice in a fire extinguishing pattern.

11. A sprinkler head according to claim 10 wherein said inlet orifice and said outlet orifice are rectilinearly aligned.

* * * * *